May 5, 1936.　　　　J. W. BRUNETTE　　　　2,039,474
CURB AND FENDER LOCATOR
Filed Aug. 2, 1934　　　2 Sheets-Sheet 1
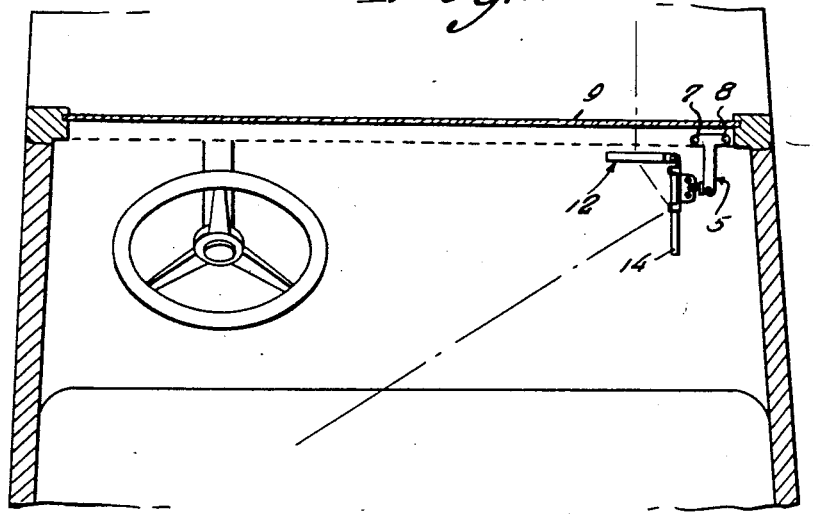
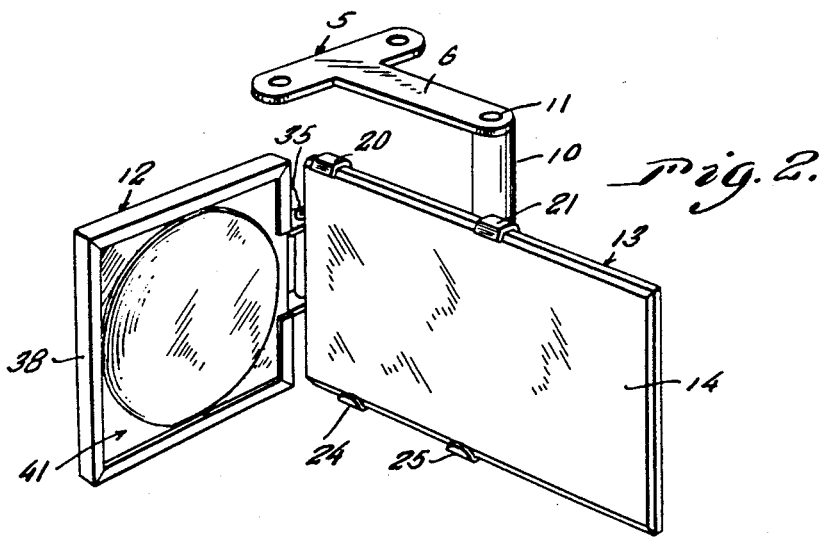
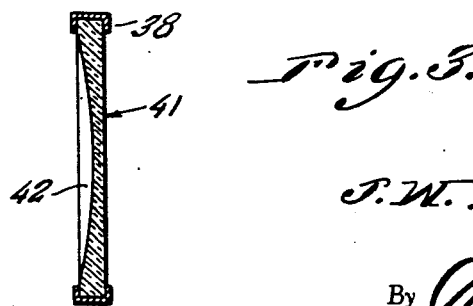
Inventor
J. W. Brunette
By Clarence A. O'Brien
Attorney May 5, 1936.                J. W. BRUNETTE                2,039,474
                          CURB AND FENDER LOCATOR
                          Filed Aug. 2, 1934          2 Sheets-Sheet 2

Inventor
J. W. Brunette

By Clarence A. O'Brien
Attorney

Patented May 5, 1936

2,039,474

UNITED STATES PATENT OFFICE 2,039,474

CURB AND FENDER LOCATOR

Joseph W. Brunette, Detroit, Mich.

Application August 2, 1934, Serial No. 738,136

1 Claim. (Cl. 88—93)

My invention relates generally to means for mounting on an automobile to enable the driver to see his right front fender and the curb which would otherwise be hidden or obscured by portions of the automobile, and an important object of the invention is to provide means of this character which may be mounted in a variety of places on the automobile and which is capable of being adjusted for different types of automobiles and different drivers.

It is also an important object of my invention to provide means of the character indicated above which is simple and inexpensive yet efficient and rugged, and which is capable of being given an attractive and neat appearance.

Other objects and advantages of my invention will be apparent from a reading of the following description in connection with the drawings, wherein for purposes of illustration I have shown a preferred embodiment of my invention.

In the drawings:—

Figure 1 is a horizontal sectional view through the driving compartment of an automobile showing the device of the invention installed therein with phantom lines indicating generally the travel of the light rays to the eye of the driver.

Figure 2 is a perspective view of the device.

Figure 3 is a transverse vertical sectional view through the lens member.

Figure 4:
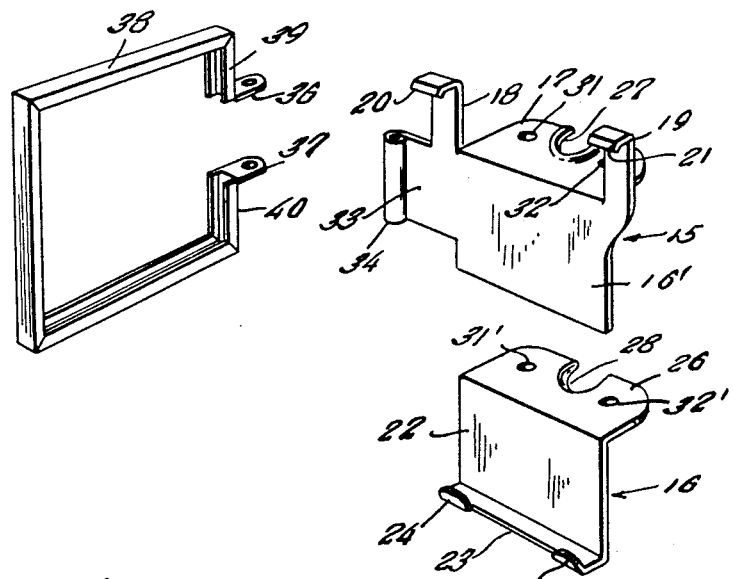
Figure 4 is a perspective group showing the lens frame and the members of the mirror bracket.

The present invention is an improvement over and further development of the subject matter of my co-pending application Serial No. 732,166, filed June 23, 1934.

Referring in detail to the drawings, the numeral 5 refers generally to the mounting bracket which may comprise the T-shaped horizontal portion 6 through the outer ends of the arms of the cross head of which pass screws or bolts 7, 8 whereby the bracket is attached to the windshield header or other suitable place on the automobile near the windshield 9 as indicated in Figure 1.

From the foot portion of the member 6 depends the round vertical rod 10 which is connected by a rivet or the like 11 which may be so arranged as to permit the member 10 to turn relative to the member 6, if desired.

On one side of the lower end of the member 10 is a swivel ball 11 on which the lens member generally designated 12, and the mirror member generally designated 13 are adjustably clamped and swivelled. The mirror member 13 includes the elongated preferably rectangular mirror 14 and the upper bracket 15 and the lower bracket 16.

Figure 5:
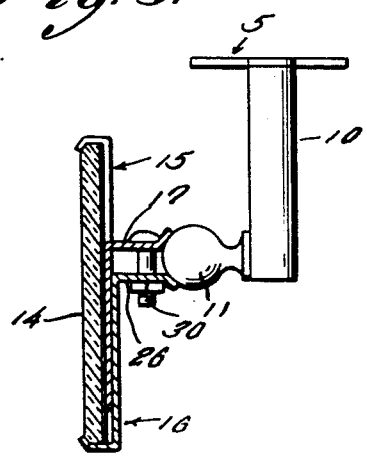
Figure 5 is a transverse vertical sectional view through the mirror and its supporting bracket, and also showing the means for supporting the bracket from a part of the vehicle.
Figure 6:
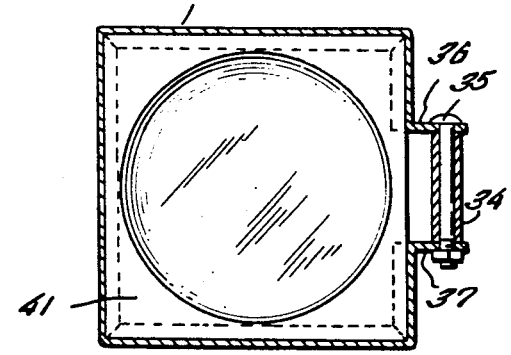
Figure 6 is a longitudinal sectional view through the lens member.

The upper bracket 15 comprises the vertical plate 16' which is cut out as indicated to provide the laterally bent portion 17 and the upstanding end portions 18, 19 which have laterally and downwardly turned hook portions 20, 21, respectively, for engaging the upper edge of the mirror 14 as indicated in Figure 2. The lower member 16 consists of the vertical plate 22 which has on its lower edge the lateral flange 23 provided at opposite ends with laterally directed hook portion 24, 25, respectively, for engaging under the lower edge of the mirror 14 as indicated in Figure 2. The upper edge of the plate 22 has a lateral portion 26 corresponding in shape and arrangement to the plate 17 of the upper member 15. The plate 17 of the upper member has an upwardly embossed socket forming portion 27 while the portion 26 of the lower member has a downwardly embossed socket forming portion 28 which are adapted to register on opposite sides of the swivel ball 11, receiving corresponding portions of the swivel ball therein as indicated in Figure 5. Bolts 30 pass through registering holes 31, 32 and 31', 32' in the respective portions 17, 26 to draw the socket forming portions against opposite sides of the swivel ball, so as to frictionally clamp the mirror member on the bracket 5 and at the same time clamp the mirror 14 in place.

The upper member 15 has an extension 33 at one end which is rolled into a journal 34 to receive a bolt or pin 35 which passes therethrough and also through holes in ears 36, 37 on the frame 38 of the lens member 12.

The frame 38 is a three-sided channel as shown in Figure 4 having a mutilated fourth side providing the portions 39, 40 which terminate in the ears 36, 37.

The lens 41 is rectangular in form and has a concaved circular part 42 on the side which faces rearwardly in the manner indicated in Figure 1, the concavity being of a diameter which approximates the width of the mirror 14. The lens fits in the channels of the frame 38 and tightening the bolt or pin 35 so as to bring the ears 36, 37 to bear on the opposite ends of the journal sleeve 34 results in tightening the frame on the edges of the lens so as to securely hold the lens and assembling the lens member to the mirror member.

It is to be noted that the concavity of the lens 41 faces rearwardly and that the lens member 12 is adjusted relative to the mirror member 13 so that the light rays coming from the right hand front fender and the curb will impinge upon the smooth side of the lens, be bent in passing through the lens and impinge upon the mirror 14 at such an angle as to be reflected into the field of vision of the driver of the automobile. It is obvious that various adjustments of the lens relative to the mirror may be necessary to obtain the desired field of vision, and that the arrangement of the invention enables swiveling the entire device or the combination of the lens member and mirror member together relative to the bracket 5, to obtain the correct adjustment for tall and short drivers and for different automobiles. It is obvious that tightening the bolt 35 and the bolts 30 will enable strongly frictionally locking the parts in the selected adjusted positions.

Although I have shown and described herein a preferred embodiment of my invention, it is to be definitely understood that I do not desire to limit the application of the invention thereto, and any change or changes may be made in materials, and in the structure and arrangement of parts, within the spirit of the invention and the scope of the subjoined claim.

What is claimed is:—

Means for permitting a driver of an automobile to observe the position of the right fender of the automobile with respect to a curb or other object, comprising a bracket supported in a forward corner of the body of the vehicle, a vertically arranged member carried by the bracket, a frame, a universal connection between the frame and said member, a mirror carried by the frame, a second frame hinged to the front end of the first mentioned frame and a lens carried by the second frame for directing light rays upon the mirror.

JOSEPH W. BRUNETTE.